US007989999B2

(12) United States Patent
Ono et al.

(10) Patent No.: US 7,989,999 B2
(45) Date of Patent: Aug. 2, 2011

(54) STARTER

(75) Inventors: Hitoshi Ono, Kiryu (JP); Tomohiko Ikemori, Kiryu (JP); Masahiro Kameda, Kiryu (JP); Masataka Odagiri, Kiryu (JP)

(73) Assignee: Mitsuba Corporation, Gunma (JP)

( * ) Notice: Subject to any disclaimer, the term of this patent is extended or adjusted under 35 U.S.C. 154(b) by 245 days.

(21) Appl. No.: 11/922,005

(22) PCT Filed: Jun. 22, 2006

(86) PCT No.: PCT/JP2006/312535

§ 371 (c)(1),
(2), (4) Date: Aug. 12, 2009

(87) PCT Pub. No.: WO2006/137494

PCT Pub. Date: Dec. 28, 2006

(65) Prior Publication Data

US 2009/0295240 A1 Dec. 3, 2009

(30) Foreign Application Priority Data

Jun. 23, 2005 (JP) ................................ 2005-183762

(51) Int. Cl.
*H02K 11/00* (2006.01)
*H02K 5/00* (2006.01)
*F02N 11/08* (2006.01)

(52) U.S. Cl. .................. 310/71; 310/89; 74/7 A; 74/7 E

(58) Field of Classification Search .................... 310/71, 310/89; 74/7 A, 7 E; 475/331

See application file for complete search history.

(56) References Cited

U.S. PATENT DOCUMENTS 5,148,713 A * 9/1992 Kimura et al. ...................... 74/6
5,167,162 A * 12/1992 Nagashima et al. ............ 74/7 A
5,189,921 A * 3/1993 Nagashima et al. ............ 74/7 A
5,334,897 A * 8/1994 Ineson et al. .................... 310/89
5,521,441 A 5/1996 Shiga et al.

FOREIGN PATENT DOCUMENTS

JP 8-284784 10/1996
JP 9-324727 12/1997
JP 10-89203 4/1998

OTHER PUBLICATIONS

Patent Cooperation Treaty (PCT) International Preliminary Report on Patentability and Written Opinion of the International Searching Authority, issued Dec. 24, 2007 in International Application No. PCT/JP2006/312535.
International Search Report issued Aug. 8, 2006 in the International (PCT) Application of which the present application is the U.S. National Stage.

* cited by examiner

*Primary Examiner* — Tran N Nguyen
(74) *Attorney, Agent, or Firm* — Wenderoth, Lind & Ponack, L.L.P.

(57) ABSTRACT

In a starter includes a motor provided with a motor contact for controlling electric power supply to an armature arranged inside a motor housing; a gear cover section, which is mounted on the motor, having a flange section formed on the outer circumference thereof; a switch terminal located on the outside of the gear cover section; and a magnet switch connected to the switch terminal. The switch terminal is installed in the vicinity of the flange section and in a region within the range of projection of the flange section . In the flange section, there are provided a rib and a motor terminal mounting section, and the switch terminal is arranged in a switch terminal containing section formed between the rib, the sidewall of the motor terminal mounting section and the flange section.

5 Claims, 4 Drawing Sheets

[Fig.1]
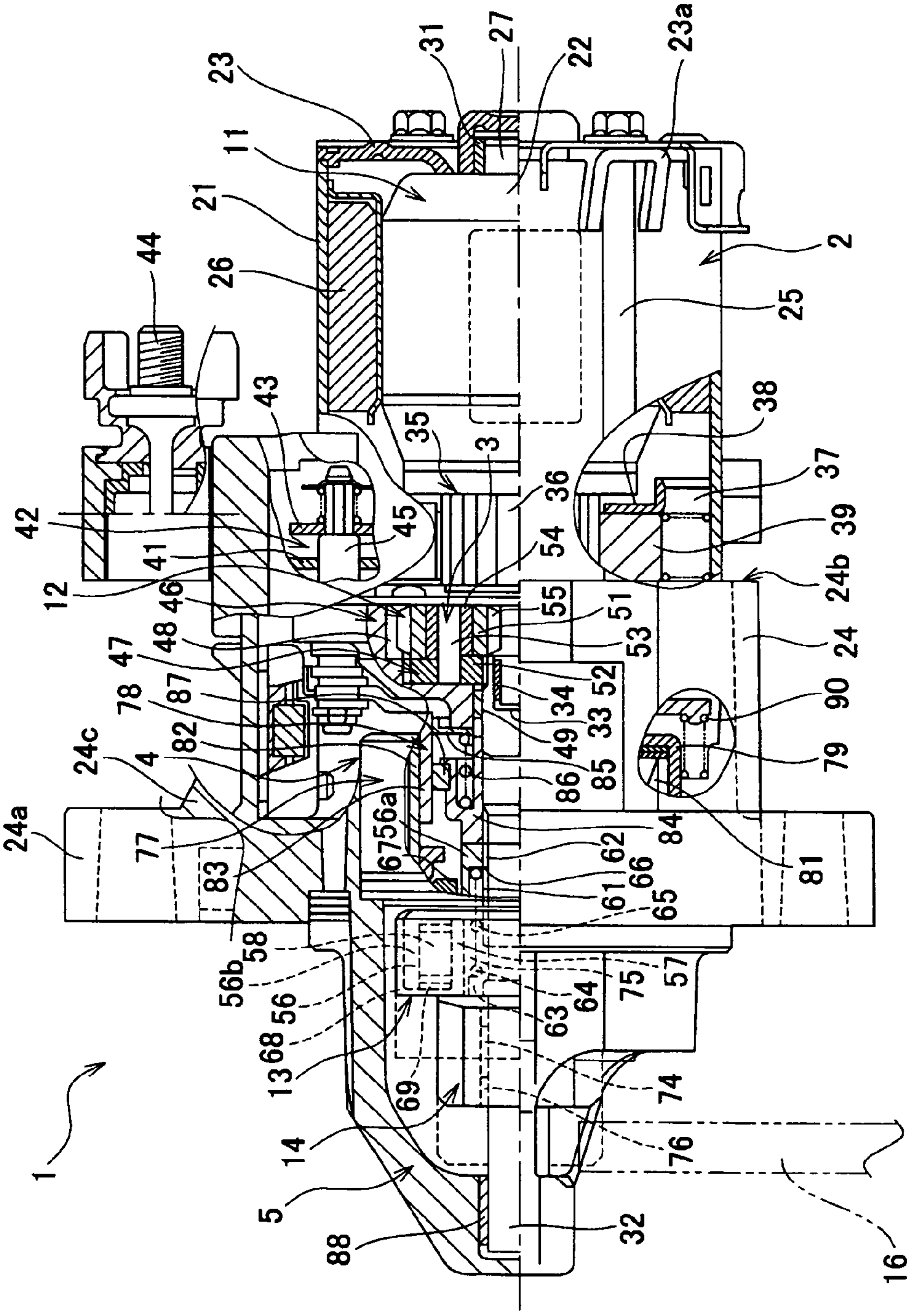

[Fig.2]
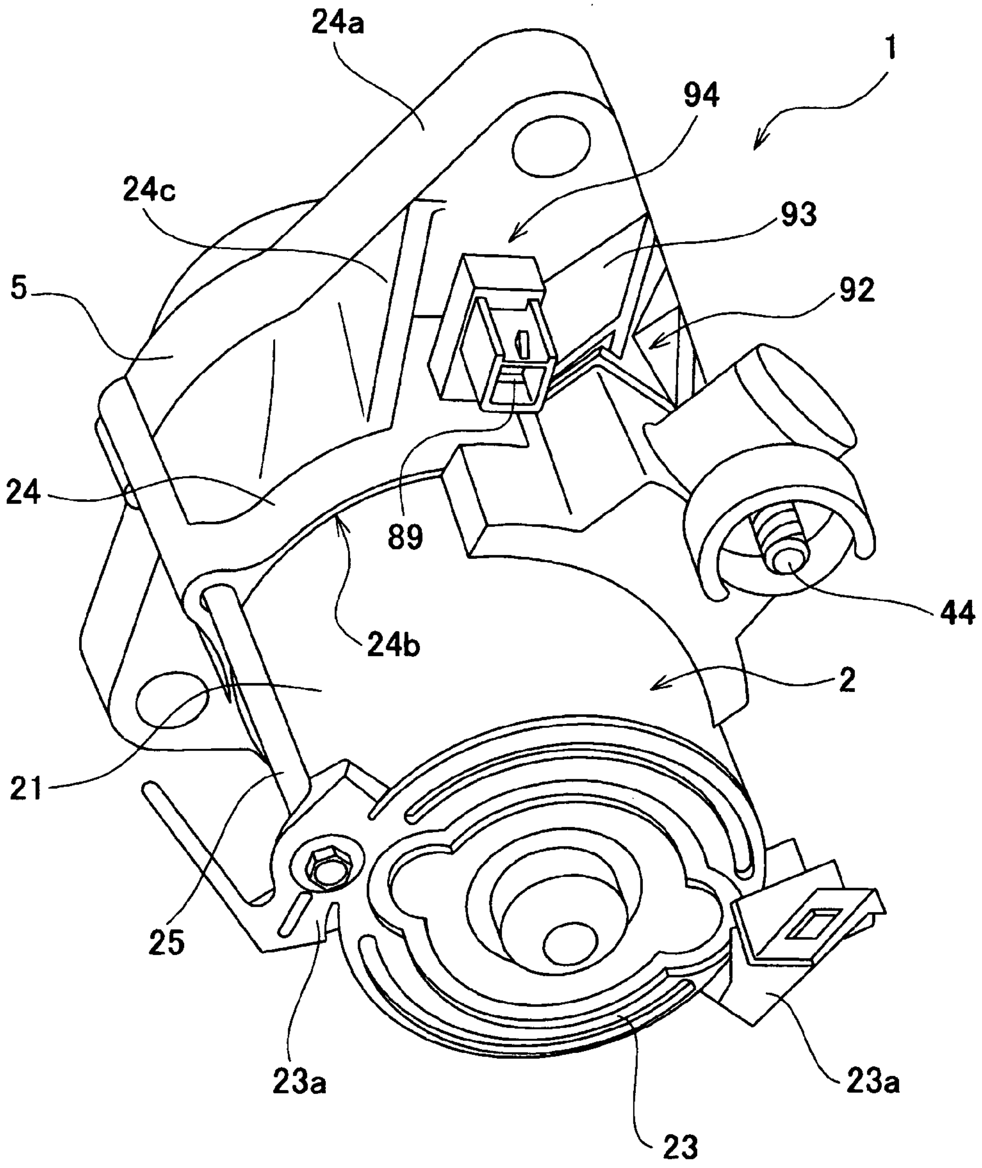

[Fig.3]
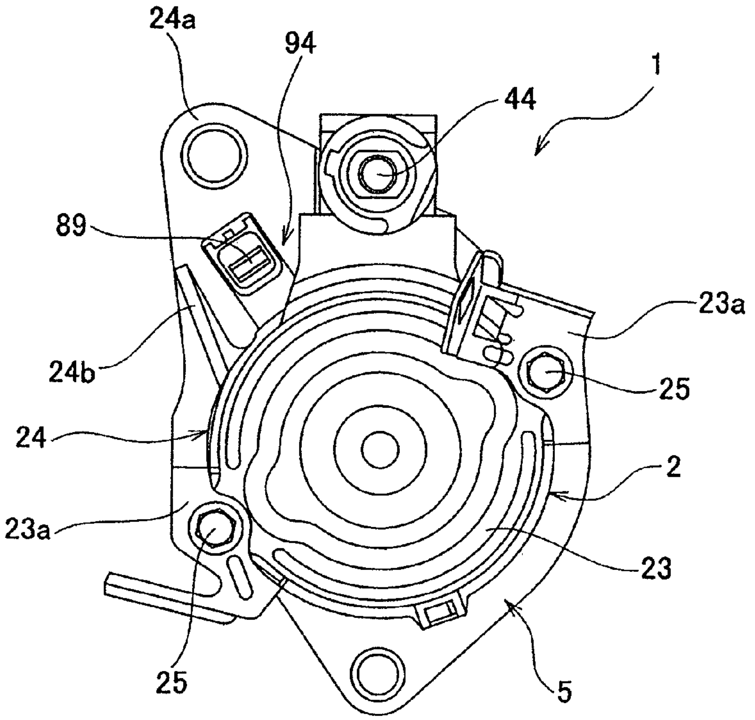
[Fig.4]
PRIOR ART
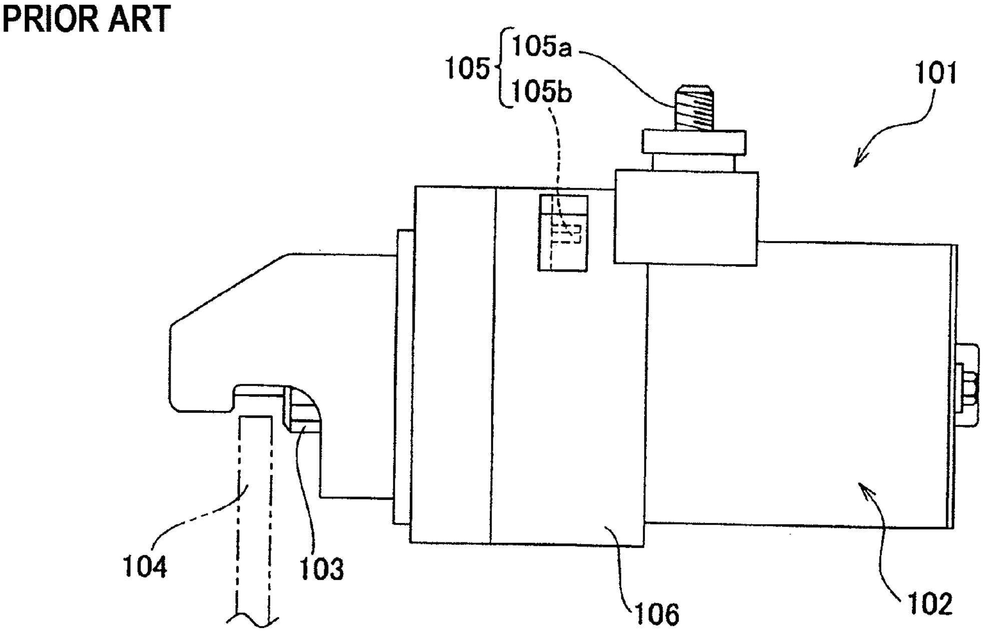

[Fig.5]
PRIOR ART
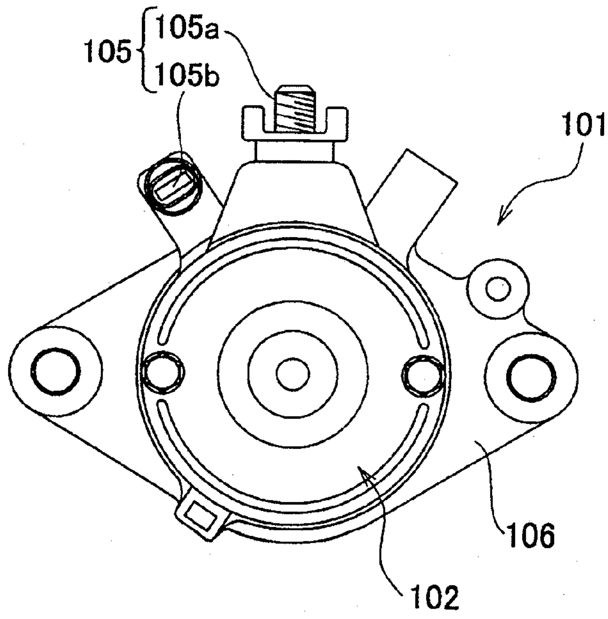

STARTER

TECHNICAL FIELD

The present invention relates to a starter mounted to an engine of an automotive etc. and used for starting the engine, and more particularly, to a terminal mounting position of a starter rotary-driven by an electric motor.

BACKGROUND ART

In engines used in cars, two-wheeled motor vehicles and large generators, a starting operation is generally performed by an electric starter mounted to an engine. FIG. 4 is a side view showing the configuration of such a starter, and FIG. 5 is a front view of the starter of FIG. 4. As shown in FIG. 4, the starter 101 uses an electric starter motor 102, and a pinion gear 103 is rotary-driven via a reduction gear mechanism (not shown) and an overrunning clutch (not shown). The pinion gear 103 is mounted movably in an axial direction. When a starter switch is turned ON, the pinion gear 103 is moved by the operation of a magnet switch (not shown) in the axial direction and brought into engagement with a ring gear 104 of the engine.

In this starter 101, as shown in FIG. 5, there is provided an external terminal 105 for supplying power source to the starter motor 102 and the magnet switch. The external terminal 105 includes a motor power source terminal 105*a* and a switch terminal 105*b*, each protruding outward from a gear cover 106 of the starter 101. The motor power source terminal 105*a* is connected directly to a battery (not shown), and when the magnet switch is turned ON, power is supplied from the battery to the starter motor 102. The switch terminal 105*b* is connected to an engine control unit (ECU), and when the starter switch is turned ON, power is supplied to the magnet switch.

Patent Document 1: Jpn. Pat. Appln. Laid-Open Publication No. 9-324727

However, in this starter 101, since the switch terminal 105*b* is located in a region out of the range of projection of the gear cover 106, there is a problem that the area of projection of the entire starter is enlarged, making it difficult to lay out in a car body. Moreover, as can be clearly seen from FIG. 5, since the switch terminal 105*b* protrudes alone from the gear cover 106, there is also a problem that the switch terminal 105*b* collides with or is caught by an object of some kind easily when it is mounted to the car body. If the switch terminal 105*b* collides with any other object, there is a risk of leading to a damaged terminal or a disconnected lead wire. Therefore, it has been desired to eliminate the above-described problems.

An object of the present invention is to provide a starter having a small entire area of projection, wherein the switch terminal is at low risk of being broken by colliding with an object of some kind.

SUMMARY OF THE INVENTION

The starter of the present invention comprises a motor provided with an armature arranged inside a cylindrical yoke and a motor contact for controlling electric power supply to the armature, a case member mounted to one axial end portion side of the motor and including a flange section for mounting an engine, a switch terminal located on the outside of the case member, and a magnet switch provided with a coil connected electrically to the switch terminal and with a moving core attracted by magnetic force generated by the coil and closing the motor contact by moving the moving core, is characterized in that the switch terminal is installed in the vicinity of the flange and in a region within the range of projection of the flange.

In the starter of the present invention, since the switch terminal of the motor is located in the vicinity of the flange and in a region within the range of projection of the flange, the switch terminal does not protrude alone from the body portion of the starter, thereby enabling the area of projection of the entire starter to be reduced and the starter itself to be protected by the flange section. Therefore, compared to a conventional starter in which a switch terminal protrudes alone, the starter of the present invention can be laid out more easily, the switch terminal seldom collides with or is caught by an object of some kind, and a damaged terminal or a disconnected lead wire can be prevented.

In the starter, the switch terminal may be arranged between the flange and the end portion of the motor side of the case member. Moreover, in the starter, the switch terminal may be arranged laterally in the vicinity of a rib provided in the flange, thereby enabling the switch terminal to be protected by the flange section and the rib and to be prevented from colliding with an object of some kind more effectively.

In the starter, there may be provided additionally on the outside of the case member a motor terminal mounting section to which a motor terminal connected electrically to the motor contact is mounted, the switch terminal may be arranged in a switch terminal containing section formed between the flange, the rib and the motor terminal mounting section. Thereby, the switch terminal is protected also by the motor terminal mounting section in addition to the flange and the rib, enabling the switch terminal to be prevented from colliding with any other object more effectively. In this case, within the switch terminal containing section, the switch terminal may be surrounded on three sides by the flange, the rib and a sidewall provided in the motor terminal mounting section.

Advantages of the Invention

According to the starter of the present invention, the switch terminal of the motor is located in the vicinity of the flange and in a region within the range of projection of the flange, thereby enabling the switch terminal to be prevented from protruding alone from the body portion of the starter. Therefore, not only the area of projection of the entire starter can be reduced, but also the starter itself can be protected by the flange section. Accordingly, compared to a conventional starter in which a switch terminal protrudes alone, the starter of the present invention can be laid out more easily, the switch terminal seldom collides with or is caught by an object of some kind, and a damaged terminal or a disconnected lead wire can be prevented. As a result thereof, the reliability of the product can be improved.

BRIEF DESCRIPTION OF THE DRAWINGS

[FIG. 1] A partly sectional side view showing a configuration of a starter according to one embodiment of the present invention.

[FIG. 2] A perspective view of the starter of FIG. 1.

[FIG. 3] A front view of the starter of FIG. 1.

[FIG. 4] A side view showing a configuration of a conventional starter.

[FIG. 5] A front view of the starter of FIG. 4.

Explanation of Reference Symbols

| | | | |
|---|---|---|---|
| 1: | starter | 2: | motor section |
| 3: | gear section | 4: | magnet switch section |
| 5: | case section | 11: | electric motor |

-continued

| Explanation of Reference Symbols | | | |
|---|---|---|---|
| 12: | planetary gear mechanism | 13: | overrunning clutch |
| 14: | pinion | 15: | idle gear |
| 16: | ring gear | 21: | motor housing |
| 22: | armature | 23: | rear bracket |
| 23a: | bolt bracket | 24: | gear cover section |
| 24a: | flange section | 24b: | end portion |
| 24c: | rib | 25: | set bolt |
| 26: | permanent magnet | 27: | motor shaft |
| 31: | metal bearing | 32: | drive shaft |
| 33: | bearing section | 34: | metal bearing |
| 35: | commutator | 36: | commutator piece |
| 37: | brush holder | 38: | brush holding section |
| 39: | brush | 41: | conductive plate |
| 42: | switch section (motor contact) | 43: | switch plate |
| 44: | motor terminal | 45: | switch shaft |
| 46: | internal gear unit | 47: | drive plate unit |
| 48: | internal gear | 49: | metal bearing |
| 51: | planetary gear | 52: | base plate |
| 53: | support pin | 54: | metal bearing |
| 55: | sun gear | 56: | clutch outer |
| 56a: | boss section | 56b: | clutch section |
| 57: | clutch inner | 58: | roller |
| 59: | clutch spring | 61: | helical spline section |
| 62: | spline section | 63: | stopper |
| 64: | circlip | 65: | gear return spring |
| 66: | inner end wall | 67: | clutch stopper |
| 68: | clutch cover | 69: | clutch washer |
| 74: | shaft hole | 75: | spring holding section |
| 76: | pinion gear metal | 77: | secured section |
| 78: | movable section | 79: | case |
| 81: | coil | 82: | stationary iron core |
| 83: | movable iron core | 84: | gear plunger |
| 85: | bracket plate | 86: | plunger spring |
| 87: | slide bearing | 88: | metal bearing |
| 89: | switch terminal | 90: | switch return spring |
| 92: | mounting section | 93: | sidewall |
| 94: | switch terminal containing section | | |
| 101: | starter | 102: | starter motor |
| 103: | pinion gear | 104: | ring gear |
| 105: | external terminal | | |
| 105a: | motor power source terminal | 105b: | switch terminal |
| 106: | gear cover | | |

DETAILED DESCRIPTION OF THE INVENTION

Now, embodiments of the present invention will be described in detail with reference to the accompanying drawings. FIG. 1 is a partly sectional side view showing a configuration of a starter according to one embodiment of the present invention. The starter 1 of FIG. 1 is used for starting an automotive engine and imparts rotations required for fuel intake, atomization, compression and ignition to an engine in a stop state.

Roughly speaking, the starter 1 comprises a motor section 2, a gear section 3, a magnet switch section 4, and a case section 5. In the motor section 2, there is provided an electric motor 11 (hereinafter, referred to as motor 11) as a driving source, and in the gear section 3, there are provided a planetary gear mechanism 12 as reduction gears, an overrunning clutch 13 and a pinion 14. The pinion 14 is mounted so as to be movable axially (in the left and right directions in the figure), and when moving in the left direction in the figure (hereinafter, the left and right direction will be based on FIG. 1 and the phrase "in the figure" will be omitted), the pinion 14 engages with a ring gear 16 of the engine. The torque of the motor 11 is transmitted to the pinion 14 via the planetary gear mechanism 12 and the overrunning clutch 13, and then, from the pinion 14 to the ring gear 16, starting the engine.

The motor 11 is configured to arrange an armature 22 rotatably within a cylindrical motor housing 21. The motor housing 21 acts also as the yoke of the motor 11 and is made of a magnetic metal such as iron. A metallic rear bracket 23 is mounted to the right end portion of the motor housing 21. On the other hand, the left end portion of the motor housing 21 is mounted to the gear cover section 24 of the case 5. On the outer circumference of the rear bracket 23, there are formed bolt brackets 23*a* through which set bolts 25 are threaded. The rear bracket 23 is secured to the gear cover section 24 by the set bolts 25, and the motor housing 21 is secured between the rear bracket 23 and the gear cover section 24. In the gear cover 24, there is provided flange section 24*a* for mounting the starter 1 to an engine.

A plurality of permanent magnets 26 are secured to the inner circumferential surface of the motor housing 21 in a circumferential direction, and an armature 22 secured to a motor shaft 27 is provided inside each of the permanent magnets 26. The right end portion of the motor shaft 27 is supported rotatably by a metal bearing 31 mounted on the rear bracket 23. The left end portion of the motor shaft 27 is supported rotatably by an end portion of a drive shaft 32 to which the pinion 14 is mounted. In the right end portion of the drive shaft 32, a bearing section 33 is provided concavely, and the motor shaft 27 is supported rotatably by a metal bearing 34 mounted to the bearing section 33.

In the armature 22, there is provided a commutator 35 secured to the motor shaft 27 with being fitted thereon. A plurality of commutator pieces 36 made of a conductive material are fitted to the outer circumferential surface of the commutator 35, and the end section of the armature coil (not shown) is secured to each of the commutator pieces 36. A brush holder 37 is mounted to the left end section of the motor housing 21. Brush holding sections 38 are arranged in the brush holder 37 with being spaced in a circumferential direction, and a brush 39 is contained in each brush holding section 38 so as to be able to appear freely. The projecting distal end (inner diameter side distal end) of the brush 39 is in sliding contact with the outer circumferential surface of the commutator 35.

The brush 39 is connected electrically to a conductive plate 41 provided on the brush holder 37. A switch section 42 is provided on the conductive plate 41, and when a switch plate 43 comes into contact with the conductive plate 41, an electric connection is made between a motor terminal 44 and the brushes 39, supplying electric power to the commutator 35. The switch plate 43 is mounted to a switch shaft 45, and when the magnet switch section 4 turns on electricity, the switch shaft 45 moves to the left to bring the switch plate 43 into contact with the conductive plate 41.

In the planetary gear mechanism 12 of the gear section 3, there are provided an internal gear unit 46 and a drive plate unit 47. The internal gear unit 46 is secured to the right end side of the gear cover 24, and on the inner circumferential side thereof, an internal gear 48 is formed. A metal bearing 49 is contained in the center of the internal gear unit 46, supporting the right end side of the drive shaft 32 rotatably. The drive plate unit 47 is secured to the right end side of the drive shaft 32, and three planetary gears 51 are mounted with being equally spaced. The planetary gears 51 are supported rotatably by a support pin 53 secured to a base plate 52 via a metal bearing 54. The planetary gears 51 engage with the internal gear 48.

In the left end side of the motor shaft 27, a sun gear 55 is formed. The sun gear 55 engages with the planetary gears 51, and the planetary gears 51 rotate and revolute between the sun gear 55 and the internal gear 48. When the motor 11 is operated, the sun gear 55 rotates together with the motor shaft 27, and the rotations of the sun gear 55 are accompanied by the revolutions of the planetary gears 51 around the sun gear 55 with the planetary gears 51 engaging with the internal gear 48. Thereby, the base plate 52 secured to the drive shaft 32 is rotated, transmitting the decelerated rotations of the motor shaft 27 to the drive shaft 32.

The overrunning clutch 13 transmits the rotations decelerated by the planetary gear mechanism 12 to the pinion 14 in one rotation direction. The overrunning clutch 13 is configured to arrange a roller (not shown) and a clutch spring (not shown) between a clutch outer 56 and a clutch inner 57. The clutch outer 56 comprises a boss section 56*a* and a clutch section 56*b*, and the boss section 56*a* is mounted to a helical spline section 61 of the drive shaft 32. On the inner circumferential side of the boss section 56*a*, there is formed a spline section 62 engaging with the helical spline section 61, the clutch outer 56 is made movable axially on the drive shaft 32 along the helical spline section 61.

A stopper 63 is mounted to the drive shaft 32. The stopper 63 is hindered to move axially by a circlip 64 fitted to the drive shaft 32. One end side of a gear return spring 65 is attached to the stopper 63. The other end side of the gear return spring 65 is in contact with the inner end wall 66 of the boss section 56*a*. The clutch outer 56 is pushed to the right by this gear return spring 65, and at normal times (at the time of no power distribution), the clutch outer 56 is held with being in contact with a clutch stopper 67 secured to the gear cover 24.

On the inner circumference of the clutch section 56*b* of the clutch outer 56, there is provided a clutch inner 57 formed integrally with the pinion 14. A plurality of pairs of rollers 58 and clutch springs (not shown) are arranged between the clutch outer 56 and clutch inner 57. In addition, on the outer circumference of the clutch section 56*b*, a clutch cover 68 is provided, and a clutch washer 69 is fitted between the left end surface of the clutch section 56*b* and the clutch cover 68. By this clutch washer 69, the roller 58 and the clutch spring are contained on the inner circumferential side of the clutch section 56*b* with being hindered to move axially.

The inner circumferential wall of the clutch section 56*b* is formed as a cam surface including a cuneiform slope section and a curved section. The roller 58 is usually pushed by the clutch spring toward the curved section side. When the clutch outer 56 rotates and the roller 58 is interposed between the cuneiform slope section and the outer circumferential surface of the clutch inner 57 against the pushing force of the clutch spring 59, the clutch inner 57 rotates together with the clutch outer 56 via the roller 58. Thereby, when the motor 11 is operated and the drive shaft 32 rotates, the rotations thereof are transmitted from the clutch outer 56 via the roller 58 to the clutch inner 57, rotating the pinion 14.

On the contrary, when the engine is started and the clutch inner 57 rotates faster than the clutch outer 56, the roller 58 moves to the curved section side, bringing the clutch inner 57 into an idle running state to the clutch outer 56. That is, when the clutch inner 57 comes into an overrunning state, the roller 58 is not interposed between the cuneiform slope section and the outer circumferential surface of the clutch inner 57 and the rotations of the clutch inner 57 are not transmitted to the clutch outer 56. Accordingly, even if the clutch inner 57 is rotated faster from the engine side after the engine start, the rotations thereof are interrupted by the overrunning clutch 13 and are not transmitted to the motor 11 side.

The pinion 14 is a steel member formed by cold forging and is formed integrally with the clutch inner 57. On the inner circumferential side of the pinion 14, there are formed a shaft hole 74 and a spring holding section 75. In the shaft hole 74, a pinion gear metal 76 is fitted, and the pinion 14 is supported rotatably by the drive shaft 32 via a pinion gear metal 76. The spring holding section 75 is formed on the inner circumferential side of the clutch inner 57, and a stopper 63 and a gear return spring 65 are held therein.

The magnet switch section 4 is arranged concentrically with the motor 11 and the planetary gear mechanism 12 on the left side of the planetary gear mechanism 12. The magnet switch section 4 comprises a steel secured section 77 secured to the gear cover 24 and a movable section 78 arranged movably in the left and right directions along the drive shaft 32. In the secured section 77, there are provided a case 79 secured to the gear cover 24, a coil 81 held in a case 79 and a not shown stationary iron core 82 mounted to the inner circumferential side of the case 79. The coil 81 is connected electrically to a switch terminal 89 provided on the side face of the gear cover 24.

Here, the switch terminal 89 is, as shown in FIGS. 2 and 3, provided between the flange section 24*a* of the gear cover section 24 and the end portion 24*b* on the side of the motor housing 21 of the gear cover section 24. That is, the switch terminal 89 is arranged in the vicinity of and behind the flange section 24*a*. Arranging the switch terminal 89 as described above, the switch terminal 89 comes within the range of projection of the flange section 24*a*, does not protrude alone from the body portion of the starter such as the motor housing 21 and the gear cover section 24 and is protected at the rear face thereof by the flange section 24*a*. Therefore, as shown in FIG. 5, compared with a conventional starter in which a switch terminal 89 protrudes alone, the area of projection of the entire starter can be reduced and the switch terminal 89 seldom collides with or is caught by an object of some kind. Accordingly, the starter of the present invention can be laid out more easily, and a damaged terminal or a disconnected lead wire can be prevented. As a result, the reliability of the product can be also improved.

Moreover, in the gear cover section 24, there is provided a rib 24*c* for improving vibration resistance, and the switch terminal 89 is arranged laterally in the vicinity of this rib 24*c*. Thereby, the switch terminal 89 is protected not only on the rear face thereof, but also, as shown in FIGS. 2 and 3, on the left side face thereof by the rib 24*c*, enabling the switch terminal to be prevented from colliding with any other object more effectively. Further, the switch terminal 89 is arranged between the rib 24*c* and the mounting section 92 of the motor terminal 44. In the motor terminal mounting section 92, there is also provided a rib-like sidewall 93, forming a switch terminal containing section 94 surrounded on three sides by a wall between the rib 24*c*, sidewall 93 and the flange section 24*a*. In the present starter 1, the switch terminal 89 is arranged in this switch terminal containing section 94.

As described above, when the switch terminal 89 is arranged in this switch terminal containing section 94, the switch terminal 89 is protected not only by the flange section 24*a*, but also by the rib 24*c* and the sidewall 93. That is, the switch terminal 89 is protected not only on the rear face thereof, but also on both sides thereof, enabling the switch terminal to be prevented from colliding with any other object more effectively and the reliability of the switch terminal 89 to be improved further. In this case, since the flange section 24*a*, the rib 24*c* and the sidewall 93 are existing starter members, the protection of the switch terminal 98 by the present configuration can be realized without adding any extra cost.

In the movable section 78 of the magnet switch section 4, there is provided a movable iron core 83 to which the switch shaft 45 is mounted, and on the inner circumferential side of the movable iron core 83, a gear plunger 84 is mounted. On the outer circumferential side (lower end side in the figure) of the movable iron core 83, a switch return spring 90 is fitted.

The other end side of the switch return spring 90 is in contact with the gear cover 24, and the movable iron core 83 is pushed to the right.

To inner circumference of the movable iron core 83, a bracket plate 85 is secured further. One end of a plunger spring 86 is secured to the bracket plate 85 by caulking. When the ignition key switch is turned OFF (in the state of FIG. 1), the other end of the plunger spring 86 contacts with a gear plunger 84, and the gear plunger 84 is pushed by the plunger spring 86 to the left. The gear plunger 84 is mounted axially movably to the drive shaft 32, and a slide bearing 87 is provided between the gear plunger 84 and the inner circumferential surface of the movable iron core 83.

The case section 5 is provided with the aluminum die-cast gear cover 24, and the left end side of the drive shaft 32 is supported rotatably by the gear cover 24 via a metal bearing 88. Within the gear cover 24, as described above, the synthetic resin (for example, glass-fiber-reinforced polyamide) clutch stopper 67 and the case 79 are secured, and to the right end side thereof, the motor housing 21 and the end cover 23 are secured by the set bolt 25.

Now, the starting operation of an engine using such an electric starter motor 1 will be described. First, as shown in FIG. 1, when the ignition key switch of a car is turned OFF, the clutch outer 56 contacts with the clutch stopper 67 by the pushing force of the gear return spring 65. At this time, the switch plate 43 is spaced from the conductive plate 41, supplying no current to the motor 11. Further, the idle gear 15 is in the disengagement position on the right and is disengaged from the ring gear 16.

On the other hand, as shown in FIG. 4, when the ignition key switch is turned ON, the idle gear 15 moves to the left, engaging with the ring gear 16. That is, when the ignition key switch is turned ON, current flows first to the coil 81, creating suction at the magnet switch section 4. When the coil 81 is excited, a magnetic path extending through the case 79 and the stationary iron core 82 is formed, sucking the movable iron core 83 to the left. When the movable iron core 83 moves to the left against the pushing force of the switch return spring 90, the switch shaft 45 moves also to the left, bringing the switch plate 43 into contact with the conductive plate 41 to close a contact. Thereby, an electric connection is made between the motor terminal 44 and the brush 39, supplying power to the commutator 35 to start the motor 11 and rotate the armature 22. In addition, the bracket plate 85 moves also to the left, thereby compressing the plunger spring 86.

When the armature 22 is rotated, the drive shaft 32 is rotated via the planetary gear mechanism 12. The rotations of the drive shaft 32 are accompanied by the rotations of the clutch outer 56 mounted to the helical spline section 61. The twisting direction of the helical spline section 61 is set in consideration of the rotation direction of the drive shaft 32. As the clutch outer 56 rotates faster, the clutch outer 56 moves to the left along the helical spline section 61 (rest position→operation position) due to the inertial mass thereof. When the clutch outer 56 protrudes to the left, the pinion 14 also moves to the left together with the clutch outer 56 and it engages with the ring gear 16. At this time, also the gear return spring 65 is compressed by being pushed by the clutch outer 56.

When the idle gear 15 engages with the ring gear 16, the rotations of the motor 11 are transmitted to the ring gear 16, rotating the ring gear 16. The ring gear 16 is connected to a crankshaft of the engine. The rotations of the ring gear 16 are accompanied by the rotations of the crankshaft, starting the engine. When the engine is started, the pinion 14 is rotated with a high rotation speed by the ring gear 16 via the idle gear 15. However, the rotations thereof are not transmitted to the motor 11 side by the action of the overrunning clutch 13.

Further, when the clutch outer 56 moves to the left, the gear plunger 84 moves to the left by the pushing force of the compressed plunger spring 86, and then contacts with the right end surface of the clutch outer 56. At this time, the plunger spring 86 goes into a natural length state, creating a small gap between the gear plunger 84 contacting with the clutch outer 56 and the plunger spring 86.

When the engine is started, the pinion 14 is rotated with a high rotation speed, and the overrunning clutch 13 is rotated in an idle running direction. When the overrunning clutch 13 is rotated in the idle running direction, idle running torque is created in the clutch, applying torque called cutting torque to the clutch outer 56. This torque creates rightward thrust force in the clutch outer 56 via the helical spline section 61, moving the clutch outer 56 to the right. As a result, the pinion 14 may be disengaged from the ring gear 16. Thus, in the starter 1, the clutch outer 56 is held by the gear plunger 84 in the operated position, regulating the rightward movement of the pinion 14 to prevent it from being disengaged from the ring gear 16.

On the other hand, when the ignition key switch is turned OFF after the engine has been started, the power distribution to the magnet switch section 4 is stopped, and the suction thereof disappears. Then, the bracket plate 85 is pushed by the pushing force of a switch return spring 90 to the right, moving the movable iron core 83 held on the left by the suction of the stationary iron core 82 to the right. When the movable iron core 83 moves to the right, the switch shaft 45 also moves to the right, separating the switch plate 43 from the conductive plate 41 to open the contact. Thereby, the power supply to the motor 11 is shut off, stopping the rotations of the drive shaft 32 to stop also the rotations of the clutch outer 56.

When the rotations of the clutch outer 56 are stopped, the axial moving force due to the inertial mass thereof also disappears. Thus, by the pushing force of the compressed gear return spring 65, the clutch outer 56 moves to the right from the operated position to the rest position along the helical spline section 61. At this time, the gear plunger 84 is also pushed by the clutch outer 56 and returns to the state of FIG. 1. In addition, the pushing force of the gear return spring 65 is set to be greater than that of the plunger spring 86 at that time. When the clutch outer 56 moves to the right, the pinion 14 also moves to the right and it disengages from the ring gear 16.

Moreover, in the embodiment described above, there is shown a starter configured to mount an overrunning clutch 13 to a drive shaft 32 rotated by a motor 11 via planetary gear mechanism 12. However, the present invention is also applicable to various types of starters configured to have a motor having a rear bracket, such as a starter configured to mount an overrunning clutch to the distal end of a motor shaft 27.

The invention claimed is:

1. A starter comprising:

a motor provided with an armature arranged inside a cylindrical yoke and a motor contact for controlling electric power supply to the armature;

a case member mounted to one axial end portion side of the motor and including a flange section for mounting an engine;

a switch terminal located on the outside of the case member; and a magnet switch provided with a coil connected electrically to the switch terminal and with a moving core attracted by magnetic force generated by the coil and closing the motor contact by moving the moving core, wherein the switch terminal is installed in a vicinity of the flange section and in a region within a range of projection of the flange section.

2. The starter according to claim 1, wherein the switch terminal is arranged between the flange section and an end portion of a motor side of the case member.

3. The starter according to claim 1, wherein the switch terminal is arranged laterally in a vicinity of a rib provided in the flange section.

4. The starter according to claim 3, wherein there is provided, additionally on the outside of the case member, a motor terminal mounting section, wherein a motor terminal connected electrically to the motor contact is mounted to the motor terminal mounting section, and the switch terminal is arranged in a switch terminal containing section formed between the flange section and the rib as well as the motor terminal mounting section.

5. The starter according to claim 4, wherein the switch terminal within the switch terminal containing section is surrounded on three sides by the flange section, the rib and a sidewall provided in the motor terminal mounting section.

* * * * *